United States Patent [19]

Miyake

[11] Patent Number: 5,729,625
[45] Date of Patent: Mar. 17, 1998

[54] IMAGE PROCESSING METHOD AND APPARATUS WHICH EXPAND A PIXEL INTO MULTIPLE PIXELS, WITH A CHANGE IN THE NUMBER OF GRAY LEVELS

[75] Inventor: Nobutaka Miyake, Yokohama, Japan

[73] Assignee: Canon Kabushiki Kaisha, Tokyo, Japan

[21] Appl. No.: 675,415

[22] Filed: Jul. 2, 1996

[30] Foreign Application Priority Data

Jul. 14, 1995 [JP] Japan ................................ 7-178707
Apr. 4, 1996 [JP] Japan ................................ 8-082482

[51] Int. Cl.$^6$ ........................................ G06K 9/00
[52] U.S. Cl. ................................ 382/169; 382/237
[58] Field of Search ........................ 382/237, 274, 382/270, 299, 169, 172, 190, 232, 233, 235, 239, 251, 252, 253, 254, 266, 275, 276, 300, 307, 308, 263; 358/433, 423, 429, 261.4, 261.3, 426, 455, 456, 457, 458, 460, 296, 298, 467, 447, 448, 452; 347/184

[56] References Cited

U.S. PATENT DOCUMENTS

| | | | |
|---|---|---|---|
| 4,797,945 | 1/1989 | Suzuki et al. | 382/56 |
| 4,890,121 | 12/1989 | Hirahara et al. | 346/76 PH |
| 4,894,729 | 1/1990 | Murayama et al. | 358/447 |
| 5,023,919 | 6/1991 | Wataya | 382/54 |
| 5,051,844 | 9/1991 | Sullivan | 358/456 |
| 5,444,551 | 8/1995 | Miller et al. | 358/460 |
| 5,450,212 | 9/1995 | Asada | 358/458 |
| 5,528,704 | 6/1996 | Parker et al. | 382/299 |
| 5,539,843 | 7/1996 | Murakami et al. | 382/270 |
| 5,563,956 | 10/1996 | Nishikawa et al. | 382/270 |
| 5,621,543 | 4/1997 | Oomoto | 382/237 |

OTHER PUBLICATIONS

R. Floyd and L. Steinberg, "An Adaptive Algorithm for Spatial Gray Scale", SID75 Digest, pp. 36–37. No Place of Publication. No Date.

Primary Examiner—Leo Boudreau
Assistant Examiner—Bijan Tadayon
Attorney, Agent, or Firm—Fitzpatrick, Cella, Harper & Scinto

[57] ABSTRACT

An image processing apparatus converts image information each pixel of which has n gray levels into image information with an increased number of pixels each having m gray levels so that one pixel of the original image information is expanded to A×B pixels in the converted image information (where n and m are integers which satisfy the condition $n > m \geq 2$). The image processing apparatus includes a scalar quantization unit for scalar-quantizing the image information with n gray levels into image information with p gray levels wherein the scalar quantization is performed in units of pixels, with $n > p > m$; an addition coding unit and a vector coding unit for coding the image information with p gray levels supplied by the scalar quantization unit into a compressed code having a value less than p to the power of C wherein the coding is performed in units of C pixels (where $C \geq 2$); a decoding unit for decoding the code supplied by the coding units, the decoding being performed in units of C pixels; and a gradation pattern producing unit for producing a pixel arrangement pattern representing gradation on the basis of the decoded signal supplied by the decoding means wherein each pixel of the pixel arrangement pattern has m gray levels.

19 Claims, 15 Drawing Sheets

IMAGE PROCESSING METHOD AND APPARATUS WHICH EXPAND A PIXEL INTO MULTIPLE PIXELS, WITH A CHANGE IN THE NUMBER OF GRAY LEVELS

BACKGROUND OF THE INVENTION

1. Field of the Invention

The present invention relates to a method and apparatus of processing an image. More specifically, the present invention relates to an image processing apparatus for transmitting image information to an image output apparatus such as a printer designed to form an image with a lesser number of gray levels than that of an input image signal and also to a method of producing and transmitting such image information.

2. Description of the Related Art

In the art, there are various known techniques for converting multi-gray-level image information into two-level image information so that pseudo-halftone is represented even after the conversion.

Of these technique, two widely-used techniques are: (1) the dither technique in which a dither signal is superposed on an input signal in the course of the quantization process; and (2) the error diffusion technique, in which quantization errors are fed back to the quantization process for the pixels following the pixel of interest (i.e., the pixel currently being processed) (R. Floyd and L. Steinberg, "An Adaptive Alogorithm for Spatial Gray Scale", SID75 Digest, pp. 36–37).

The pseudo-halftone representation technique is used in an image output apparatus such as a printer. With the continuing rapid increase in CPU power, the process of converting image information with a great number of gray levels into pseudo-gray-level (pseudo-halftone) image information is performed more often by a host computer with a software program such as a printer driver rather than by hardware in the printer. FIG. 2 illustrates a most common system wherein the two broken-line boxes denote a printer and a printer driver, respectively. In FIG. 2, image information with a great number of gray levels (hereafter referred to as "multi-gray-level image information") is created by a host computer with an application software program, and supplied to the printer driver via an input terminal 201. The creation of image information may also be performed by an application software program provided in the printer drivers. The printer driver includes a two-level conversion unit 202 for converting an image consisting of picture elements (pixels) each having a great number of possible pray levels into a pseudo-multi-gray-level image represented by two-level signals (hereafter such a conversion process will be referred to simply as "two-level conversion"). The resultant two-level image information is transmitted to the printer via I/O interfaces (not shown).

In the printer, the received information is stored in a memory 203 in such a manner that a few lines or one page of data is stored at a time. In the case of a serial printer such as an ink-jet printer or a thermal transfer printer, the data is arranged so that it matches the structure of the print head employed in the printer, and is supplied to a printer engine 204 for a printing operation.

In the case of a color printer, a color conversion means is added in front of the two-level conversion unit 202 so that the color conversion means (implemented in application software or in the printer driver) converts RGB luminance information into YMCK intensity information which matches the engine.

With recent advancements in printer engine technology, the printer engine has come to deal with image information having a higher resolution and including a greater amount of information. One technique of facilitating the processes of dealing with such image information, including the color conversion, creation of an image by the application software program, etc., is to employ a system construction such as that shown in FIG. 3 rather than that shown in FIG. 2 so that the resolution of an image which is processed as multi-gray-level image information is reduced to a lower level than the resolution of the image output by the printer engine, wherein two-level conversion is performed after increasing the number of pixels by means of an interpolation unit 301.

However, in both techniques shown in FIGS. 2 and 3, the amount of information required to be transferred from the printer driver to the printer increases with the increase in the resolution of the printer engine. This results in an increase in the transfer time and also an increase in the memory capacity of the printer, which causes an increase in cost.

One technique to avoid the above problems is to compress the amount of information dealt with in the system shown in FIG. 2 or 3. FIG. 4 illustrates a system including an additional compression unit 401 by which, after the two-level conversion process, the image information is compressed in a reversible fashion on the basis of the run length. The compressed image information is transmitted to the printer, where the received image information is temporarily stored in a memory 203. Then image information is read from the memory 203 and decompressed by a decompression unit 402. The resultant data is supplied to a printer engine 204, which in turn outputs an image. When it is intended to shorten only the transfer time, the image information may be stored in the memory after being decompressed.

Another possible technique is shown in FIG. 5. In this technique, multi-gray-level image information is compressed by a compression unit 501 in a printer driver, by means of for example an orthogonal transformation. The compressed image information is transmitted to a printer. In the printer, the received image information is temporarily stored in a memory 203. Then image information is read from the memory 203 and decompressed by a decompression unit 502. The decompressed data is interpolated by an interpolation unit 301 and then converted into two-level data by a two-level conversion unit 202. The resultant data is supplied to a printer engine 204 which in turn outputs an image.

Also, in this technique, the compression process may be performed by application software. For example, image information may be compressed according to the JPEG (Joint Photographic Experts Group) standard (which is the international standard regarding still image coding), and the JPEG image information may be decompressed in a printer.

The conventional techniques described above have the following problems. In the technique shown in FIG. 4, a two-level image obtained as a result of the pseudo-halftone (gray level) representation process cannot be compressed with a high compression efficiency. For example, in the case of an image of characters or line drawings, the image includes a great number of spaces or blank areas, and therefore a high compression efficiency can be achieved by employing for example the run length compression technique. However, in the case of an image of a natural scene or object, the two-level conversion results in a loss of correlation among adjacent pixels of the image data. This can cause even an increase in the amount of information exceeding the amount of information of the original non-compressed image. There are some techniques of compressing the two-level image data after the error diffusion method or the dithering process. Such techniques, however, cannot provide a sufficiently high compression ratio.

In addition to the low compression ratio, the coding of variable-length data is another problem. In the conventional techniques, the characteristics of a two-level image are greatly different from that of a multi-gray-level (halftone) image, and the reversible compression method has been generally used for the compression of the two-level image in consideration of the redundancy. This means that it is difficult to perform fixed-length coding on two-level image data. However, if image data is transmitted in the form of variable length data from a printer driver to a printer, then the printer must deal with the variable transmission time, and complicated organization is required in the memory of the printer.

In the case of the system construction shown in FIG. 5, since multi-gray-level image data is compressed and then transmitted, the coding can be performed either in a fixed-length fashion or in a variable-length fashion. However, the multi-gray-level image data contains an extremely great amount of information, and therefore it is required to compress the image data with a very high compression ratio to achieve a small amount of information similar to that obtained when two-level image data is compressed. Another problem in this technique is that the printer is required to include an interpolation unit and a two-level conversion unit, which causes a great increase in cost. Furthermore, if an orthogonal transformation or the like is employed in the compression process, expensive hardware is required to decompress such data.

SUMMARY OF THE INVENTION

It is an object of the present invention to solve the above problems. More specifically, it is an object of the present invention to provide a method and apparatus for processing an image by which an image output apparatus outputs, in a high efficiency fashion, a high-quality m-Gray-level image corresponding to original n-gray-level image information (n>m>1).

It is another object of the present invention to provide a method and apparatus for processing an image, which provide both high resolution and good halftone (gray level) representation.

It is still another object of the present invention to provide a method and apparatus for processing an image, which make it possible for an image output apparatus having capability of outputting an image with a small a number of gray levels (such as two or three) to output a high-quality image.

According to an aspect of the present, there is provided an image processing apparatus for converting image information each pixel of which has n gray levels, into image information with an increased number of pixels each having m gray levels, so that one pixel of the original image information is expanded to A×B pixels in the converted image information (wherein n and m are integers which satisfy the condition n>m≧2), the image processing apparatus comprising: a quantization means for scalar-quantizing the image information with n gray levels into image information with p gray levels wherein the scalar quantization is performed in units of pixels (where n>p>m); a coding means for coding the image information with p gray levels supplied by the quantization means into a compressed code having a value less than p to the power of C wherein the coding is performed in units of C pixels (where C≧2); transmission means for transmitting the code produced by the coding means; a decoding means for decoding the code transmitted by the transmission means, wherein the decoding is performed in units of C pixels; and a gradation pattern producing means for producing a pixel arrangement pattern representing gradation on the basis of the decoded signal supplied by the decoding means, wherein each pixel of the pixel arrangement pattern has m gray levels.

According to another aspect of the invention, there is provided an image processing method for inputting image information each pixel of which has n gray levels and then converting the input image information into image information with an increased number of pixels each having m gray levels so that one pixel of the original image information is expanded to A×B pixels in the converted image information (where n and m are integers which satisfy the condition n>m≧2), the image processing method comprising: a quantization step, of scalar-quantizing the image information with n gray levels into image information with p gray levels wherein the scalar quantization is performed in units of pixels (where n>p>m); a coding step, of coding the image information with p gray levels into a compressed code having a value less than p to the power of C wherein the coding is performed in units of C pixels (where C≧2); a decoding step, of decoding the coded image information in units of C pixels; and an outputting step, of outputting a pixel arrangement pattern representing gradation on the basis of the decoded signal wherein each pixel of the pixel arrangement pattern has m gray levels.

According to still another aspect of the invention, there is provided an image processing apparatus for inputting image information each pixel of which has n gray levels and converting the input information into image information with an increased number of pixels each having m gray levels, so that each pixel of the original image information is expanded to A×B pixels in the converted image information, thereby providing pseudo-gradation (where n and m are integers which satisfy the condition n>m≧2, and A and B are also integers greater than 1), the image processing apparatus comprising: a pseudo-gradation processing means for converting a pixel of interest with n gray levels into A×B pixels each having m gray levels so that pseudo-gradation is realized by the resultant A×B pixels; a determining means for determining the number of "on" dots for each gray level of (m−1) layers for each pixel of interest which has been subjected to the pseudo-gradation processing; a grouping means for grouping the determined numbers of dots into blocks such that the number of pixels contained in each block corresponds to the input resolution; a coding means for coding the number-of-dot information associated with each gray level in units of blocks; a decoding means for decoding the code in units of blocks; and an arranging means for arranging "on" dots within an area of A×B×C pixels for each gray level of (m−1) layers on the basis of the decoded number-of-dot information.

According to a further aspect of the present invention, there is provided an image processing method for inputting image information each pixel of which has n gray levels and converting the input information into image information with an increased number of pixels each having m gray levels, so that each pixel of the original image information is expanded to A×B pixels in the converted image information, thereby providing pseudo-gradation (where n and m are integers which satisfy the condition n>m≧2, and A and B are also integers greater than 1), the image processing method comprising: a pseudo-gradation processing step, of converting a pixel of interest with n gray levels into A×B pixels each having m gray levels, so that pseudo-gradation is realized by the resultant A×B pixels; a determining step, of determining the number of "on" dots for each gray level of (m −1) layers for each pixel of interest which has been subjected to the pseudo-gradation processing; a grouping step, of grouping the determined numbers of dots into blocks such that the number of pixels contained in each block corresponds to the input resolution; a coding step, of coding the number-of-dot information associated with each gray level in units of blocks; a decoding step, of decoding the code in units of blocks; and an arranging step of arranging "on" dots within an area of A×B×C pixels for each gray level of (m −1) layers on the basis of the decoded number-of-dot information.

The above and other objects, features, and advantages of the present invention will be still more apparent, and more fully understood, from the following description.

DESCRIPTION OF THE PREFERRED EMBODIMENTS

The present invention will be described in greater detail below with reference to specific embodiments in connection with the accompanying drawings.

First Embodiment

Figure 1:
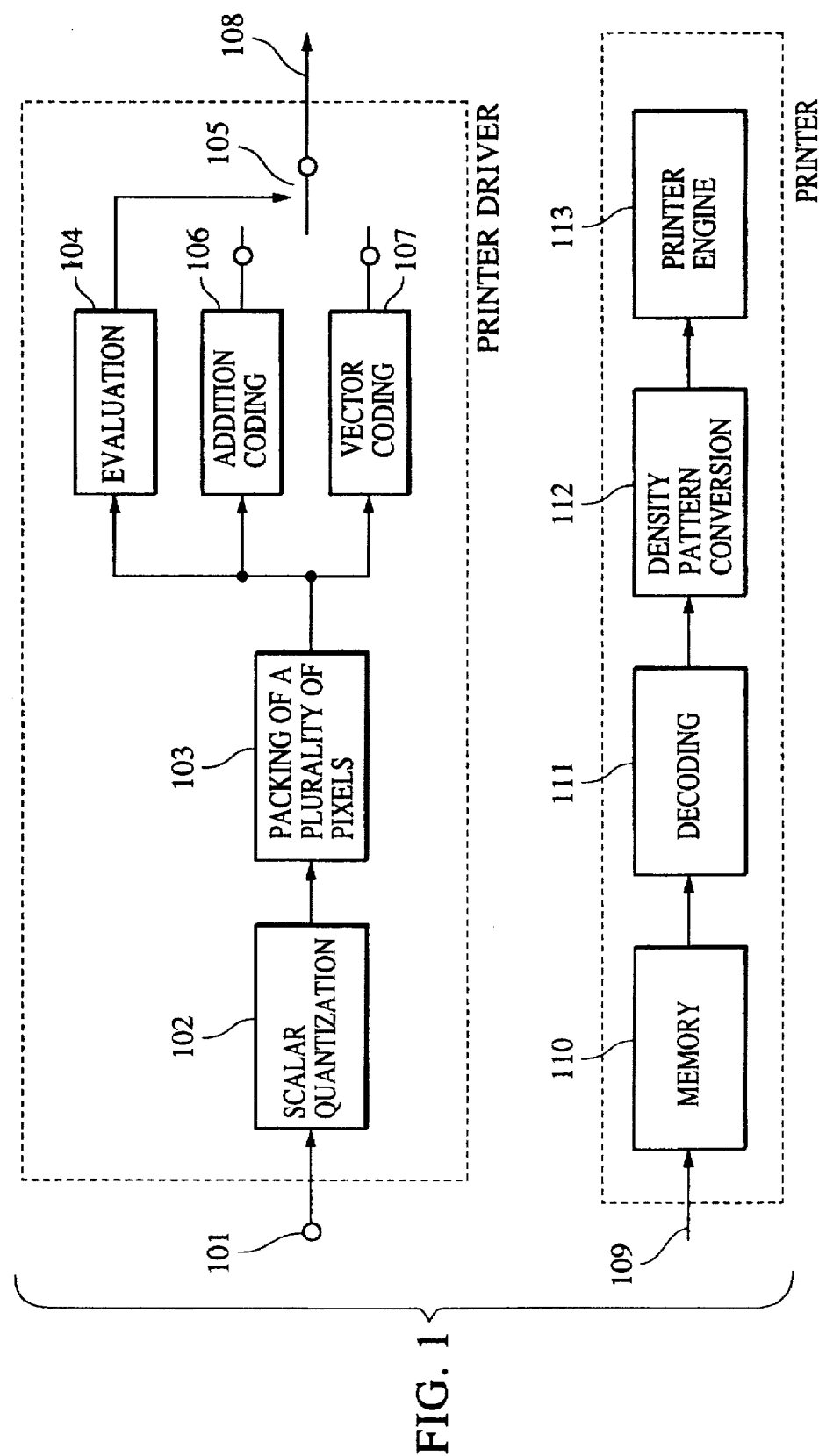
FIG. 1 is a block diagram illustrating the main parts of a first embodiment of the invention.
Figure 2:
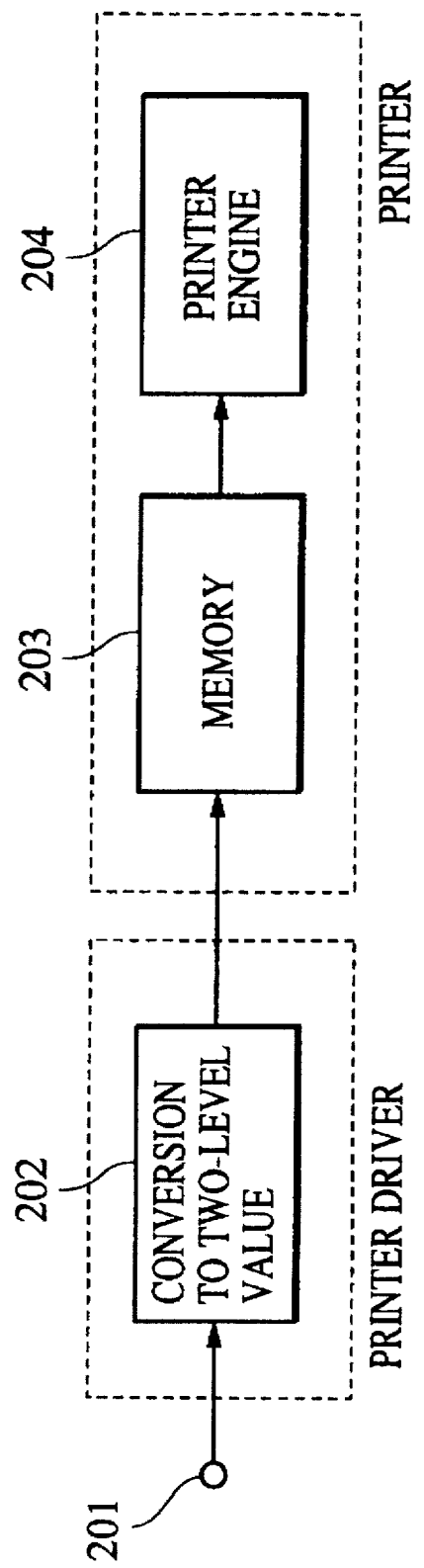
FIG. 2 is a block diagram illustrating the main parts of a conventional image processing system.
Figure 3:
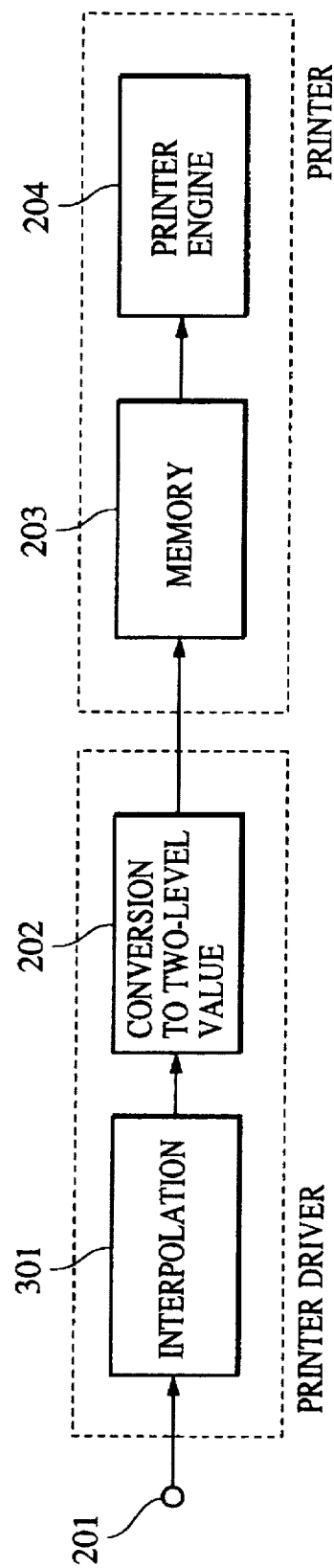
FIG. 3 is a block diagram illustrating the main parts of another conventional image processing system.
Figure 4:
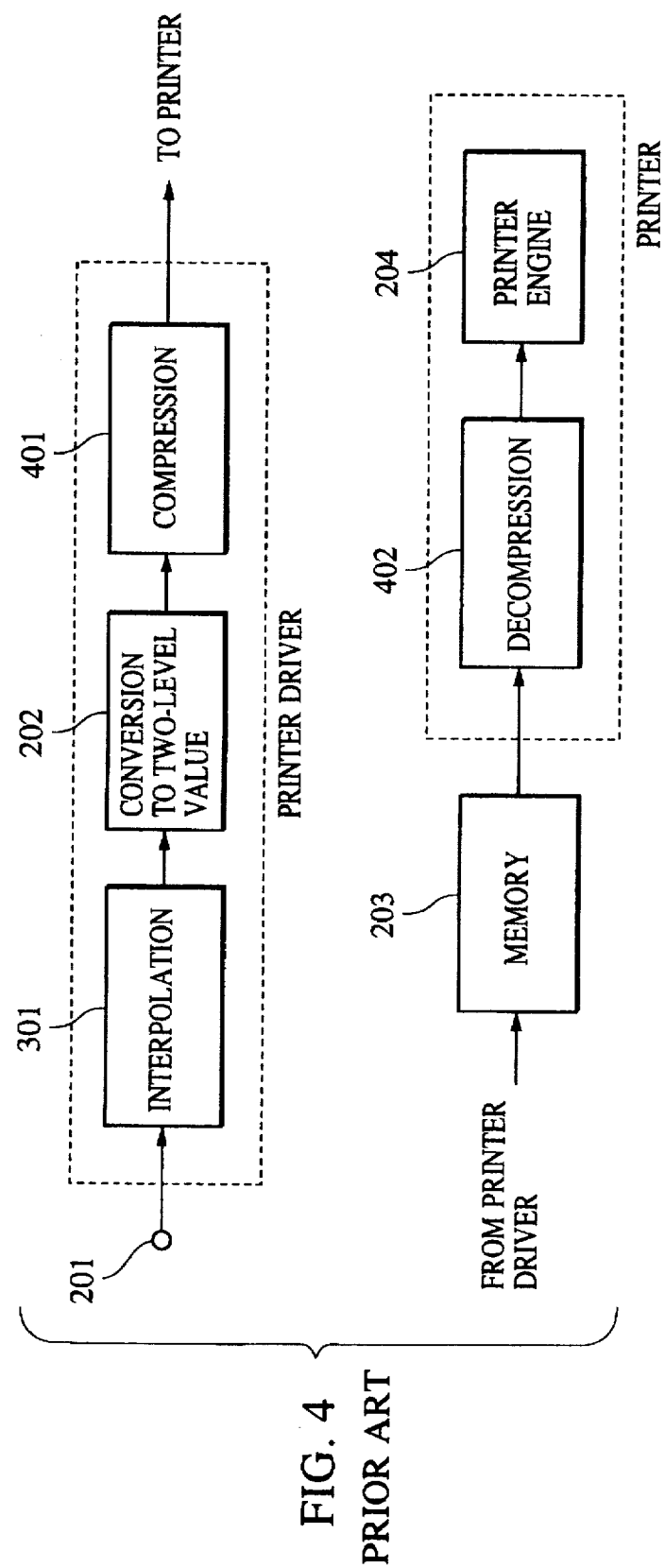
FIG. 4 is a block diagram illustrating the main parts of still another conventional image processing system.
Figure 5:
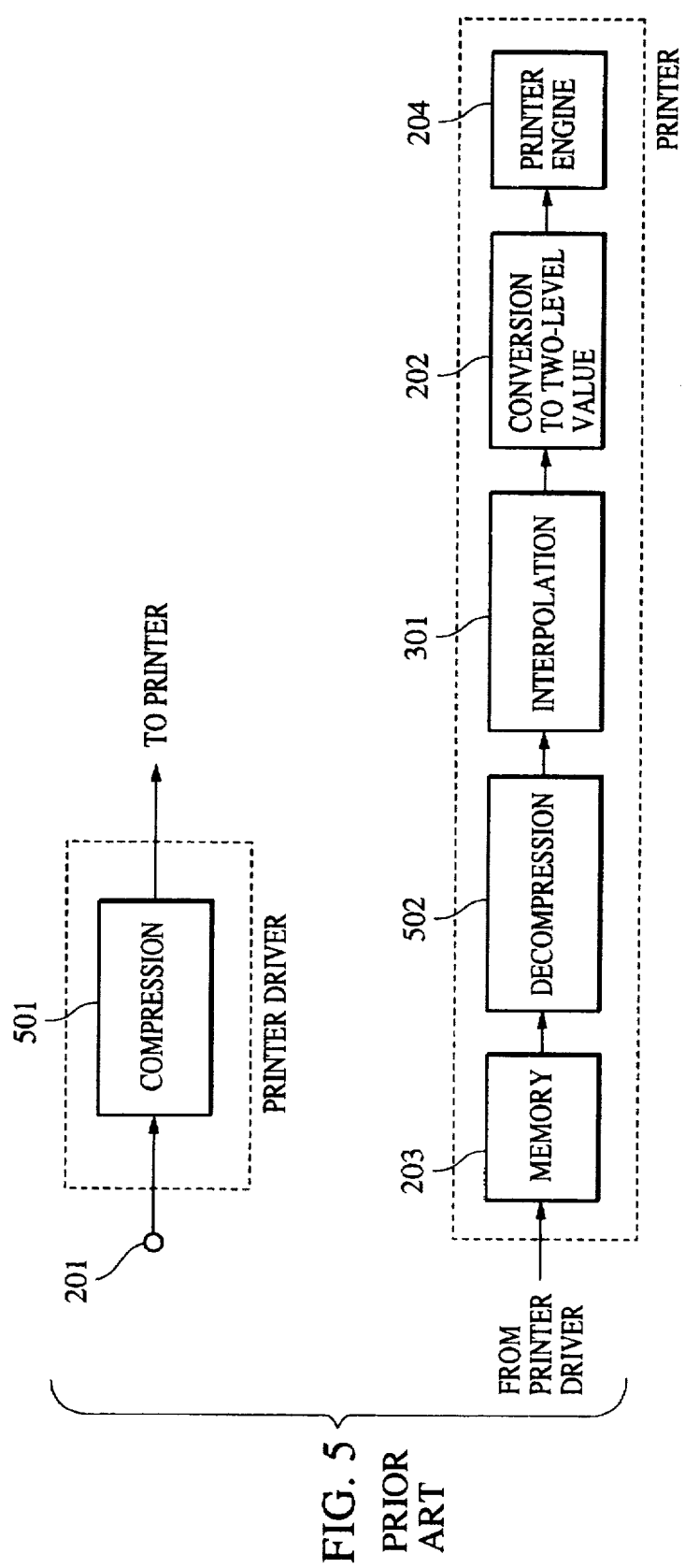
FIG. 5 is a block diagram illustrating the main parts of another conventional image processing system.

FIG. 1 is a block diagram illustrating the main parts of a first embodiment of the invention. As in the conventional system described above, the two broken-line boxes denote a printer and a printer driver in a host computer, respectively.

In FIG. 1, multi-gray-level image information created by a host computer with an application software program is supplied to the printer driver via an input terminal 101. The image information input to the printer driver may be of a natural scene or any other types of image such as characters represented in a page description language (PDL) or image information obtained by rasterizing a line drawing.

Figure 6:
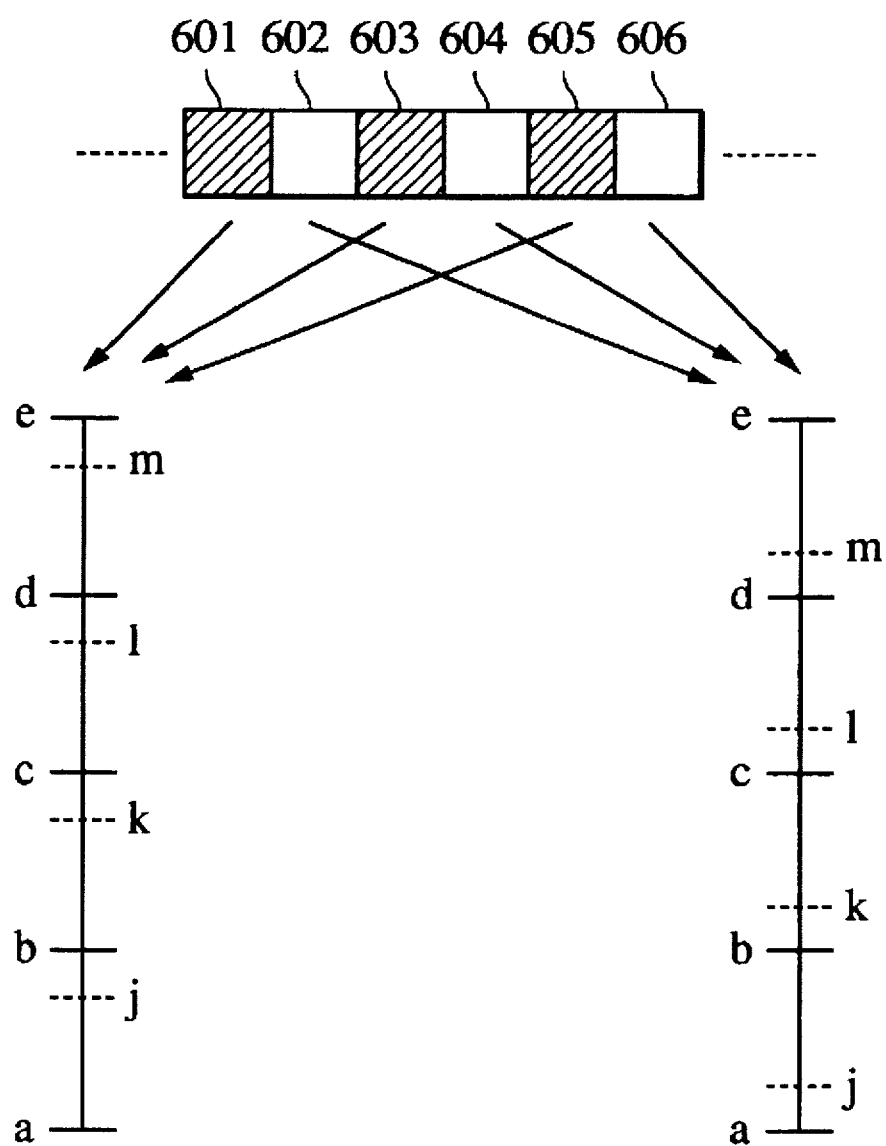
FIG. 6 is a schematic illustration of a scalar quantization process employed in the first embodiment.

The multi gray-level-image information is converted by a scalar quantization unit 102 to image information having a lesser number of gray levels. In the present embodiment, the scalar quantization process is performed as follows. FIG. 6 is a schematic illustration of the scalar quantization. In FIG. 6, reference numerals 601, 602, 603, 604, 605 and 606 denote picture elements (pixels) each having a multi-gray-level value. In this embodiment, these pixel values are quantized on the basis of a threshold value which is dithered systematically depending on the pixel locations. In the specific example shown in FIG. 6, the values of the hatched pixels (601, 603 and 605) are scalar-quantized on the basis of the quantization threshold values shown on the left side of FIG. 6, while the values of the other pixels (602, 604 and 606) are scalar-quantized on the basis of the quantization threshold values shown on the right side of FIG. 6. In FIG. 6, a, b, c, d and e denote representative quantization values and j, k, l, and m denote threshold values on the basis of which the pixel values are quantized to the representative quantization values; it is to be noted that the threshold values on the left side are different from those on the right side.

Although, in the above example, the threshold values are dithered in such a manner that the threshold values are varied only along a one-dimensional direction depending on whether the pixel is located at an even-numbered position or at an odd-numbered position, it is more desirable that the dithering be performed in two dimensions.

Furthermore, although the threshold value is varied every two pixels in the above example, it may also be varied periodically for any arbitrary number of pixels. The dithering scalar quantization prevents pixel values from being quantized to a constant value even in a plain image region. Furthermore, the quantization may be performed either in a linear fashion or in a nonlinear fashion.

In the following discussion, it is assumed that each picture element of input image information is represented with n gray levels and that the scalar quantization results in a reduction in the number of gray levels of each pixel from n to p (n>p). The quantized values are assigned numbers from 0 to p in the order from the smallest to the greatest values of the possible quantized values. These numbers are referred to as quantization coefficients. In the specific example shown in FIG. 6, the five representative quantization values a, b, c, d and e have quantization coefficients 0, 1, 2, 3, 4 and 5, respectively.

In FIG. 1, the quantization coefficients of the scalar-quantized pixel values are packed by a packing unit 103 into blocks so that each block contains a predefined constant number of pixels. The packing period may be equal to or different from the dithering period. Furthermore, the packing may be formed along one dimension or two dimensions. The packing block size is roughly determined by the compression efficiency which is desired in a specific application of an image processing system. When the packing is performed for square blocks including a plurality of pixels, the packing is equivalent to grouping into blocks.

It is assumed here that the packing is performed in units of C pixels. In this case, each unit (block) contains C pixels each may have any of p gray levels and thus the number of possible states for each block equals p to the power of C. In the present embodiment, the coding is performed in such a manner as to reduce the number of states.

For the purpose of an easier understanding, it is assumed here that p=17 and C=2. In this specific example, there are 289 possible states. This means that if the above 289 states are represented by 289 different codes, then perfect transmission of the information is possible.

In FIG. 1, reference numeral 104 denotes an evaluation unit for evaluating the vector information of the quantization coefficient of packed pixels. In this embodiment, the evaluation is performed on the basis of the difference value associated with the quantization coefficient within a packed block. In the example in which p=17 and C=2, the difference in the quantization coefficient between two pixels is calculated. In the case where each block contains three or more pixels, the evaluation may be performed on the basis of the difference between the maximum and minimum values within a block. If the evaluation unit 104 has concluded that the difference value associated with the quantization coefficient is small, an addition coding unit 106 is selected via a switch 105, while a vector coding unit 107 is selected when the evaluation unit 104 has made an opposite conclusion. In the above process, the evaluation is made by comparing the difference value with a predefined threshold value.

When the addition coding unit 106 is selected, the sum of the quantization coefficients is calculated and the result is employed as a coded value. On the other hand, when the vector coding unit 107 is selected, the coding is performed in such a manner as to preserve as good resolution as possible, which may result in a certain degree of distortion among the quantization coefficients. That is, the coding method is switched depending on whether the block under evaluation is concerned with an edge portion or a plain portion of an image. In the above coding process, different codes are employed in the addition coding from those used in the vector coding.

The coded data obtained in units of packed blocks via either the addition coding unit 106 or the vector coding unit 107 is transmitted to a printer via I/Os 108 and 109 and stored in a memory 110. In the embodiment, since a fixed known number of codes are employed, the code transmitted to the printer has a fixed length. This allows the memory 110 to be organized in a simple fashion and also makes it possible to transfer the code in a constant time period. The coded information is then read from the memory 110 and decoded by a decoder 111.

In the case where the information has been coded by the addition coding unit, the code value equals the sum of the quantization coefficients of the pixel values contained in a packed block, and thus the code value is representative of the gray levels of C pixels contained in that block. In other words, the gray level of that block is generally represented by the code value. Thus, in this case, the data is supplied to a density pattern conversion unit 112 and subjected to a pseudo-gradation process according to a density pattern generation method, which is well known in the art. On the other hand, when the data is represented by a vector code, the quantization coefficient is reproduced pixel by pixel and pseudo-gradation process is performed by applying the density pattern generation method to each pixel.

In the density pattern generation method, when a certain pixel value is given, the number of dots is determined depending on the given pixel value and the dots are arranged so that they constitute a predefined pattern corresponding to the given number of dots. Dots may be arranged from a center to a periphery as in the dithering process. Alternatively, dots may be distributed so that a higher spatial frequency may be obtained.

In the density pattern generation method, unlike the dithering process in which one output signal is given by thresholding each input signal, a plurality of two-level pixel values are output when one input signal is given. This means that both two-level conversion and resolution conversion are performed at the same time. It is assumed here that the horizontal and vertical expansion ratios are A and B, respectively, in the above density pattern generation method. The two-level information generated by the density pattern generation method is transmitted to a printer engine 113 and an output image is produced by the printer engine 113.

Figure 7:
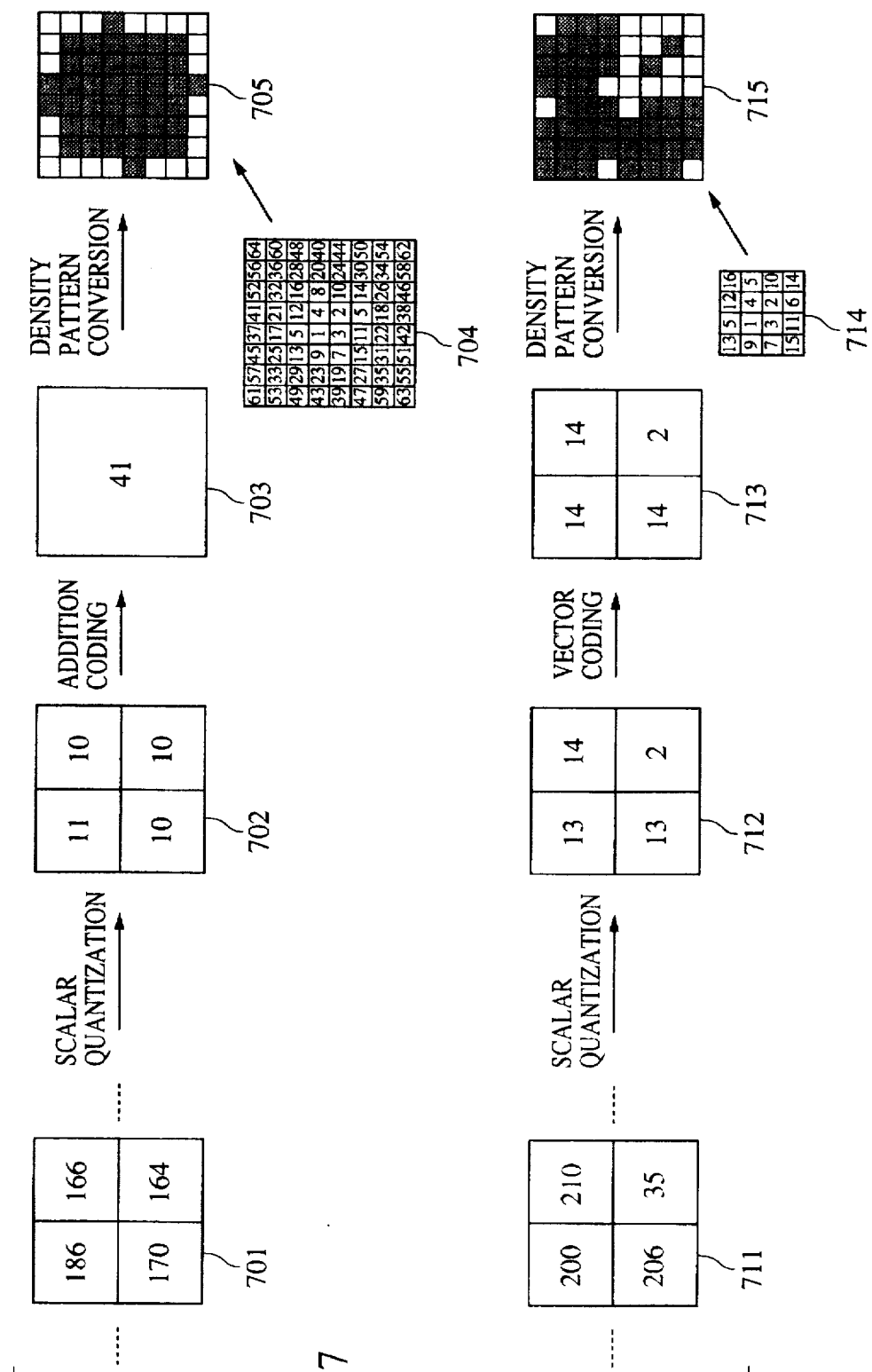
FIG. 7 is a schematic illustration of an example of a process according to the first embodiment.

With reference to FIG. 7, the coding process and the two-level conversion process according to the present embodiment of the invention are described in greater detail below.

In FIG. 7 the expansion ratios A and B and the number of packed pixels C are A=4, B=4 and C=4, respectively. When information is finally output in the form of a two-level value, it is desirable that the number of gray levels p of image information to be scalar-quantized is equal to A×B+1. Therefore, p is set to 17.

In FIG. 7, reference numeral 701 denotes a part of image information with multi gray levels. The image information 701 is scalar-quantized and four scalar-quantized pixels are packed into one block 702. Thus, the packed block 702 includes the quantization coefficients of the four pixels corresponding to the four pixels of the image information 701. The quantization coefficient of each pixel can have a value in the range from 0 to 16.

The evaluation unit 104 evaluates the quantization coefficients of the packed block 702 and concludes, in this case, that the block 702 is concerned with a plain image area. As a result, the switch 105 selects the addition coding unit 106. The addition coding unit 106 calculates the sum of the quantization coefficients of the four pixels of the block 702. The resultant value (=11+10+10+10=41) is employed as the coded value for the block including the above four pixels as shown by a block 703 in FIG. 7.

Since each quantization coefficient can have a value in the range from 0 to 16, the sum can have a value in the range from 0 to 64. If 1-byte data is used to transmit 4-pixel image information, then it is possible to assign values from 0 to 64 to the addition code and values from 65 to 255 to the vector code.

The information of the packed block 703 having a code value of "41" is transmitted from the printer driver to the printer. In the printer, a density pattern conversion unit 112 converts the received information into a two-level representation. As described above, in the case where the received information is of an addition-converted code, two-level conversion is performed by applying the density pattern generation method to each block in which C pixels (four pixels in the present example) are packed. The density pattern generation method requires a dot arranging matrix having a size expanded by the expansion ratios defined above. In this specific example, the dot arranging matrix for representing the density pattern consists of A×B×C (=4×4×4=8×8) pixels as shown by a matrix 704 in FIG. 7. In this example, the dot arranging matrix is of the concentrated type, but it may also be of other types.

The density pattern conversion unit 112 produces two-level information or a dot pattern 705 on the basis of the code value of "41" with reference to the dot arranging matrix 704. The density pattern conversion may be performed by retrieving a look-up table (LUT) when the expansion ratio is in a small range. However, if the expansion ratio is great, a large size of look-up table is required. However, if the pixel values defined in the dot arranging matrix 704 are employed as threshold values and if the code value "41" is converted into two-level data by comparing the code value "41" with these threshold values as in the dithering process, then it is very easy to determine whether each dot should be in an on-level or an off-level. Thus, two-level data can be obtained without using a look-up table (LUT).

Figure 11:
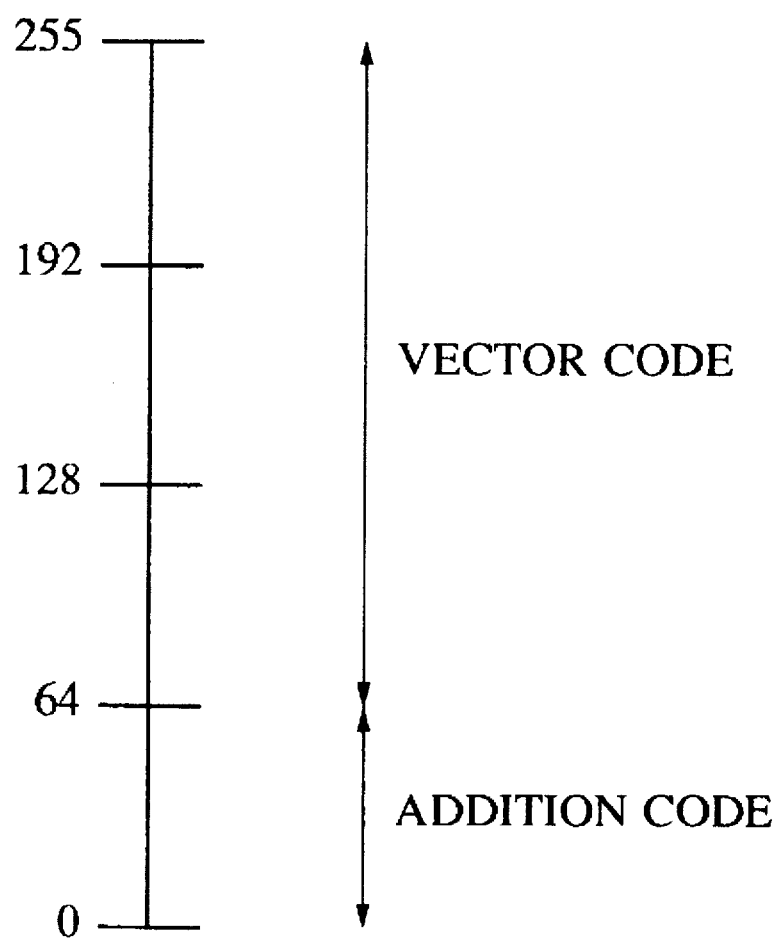
FIG. 11 is a schematic representation of an example of code assignment.

Now, the vector coding process is described below. In FIG. 7, image information 711 with multi-gray-levels is given as input information. As in the case of the image information 701, only a part of the image information is shown in FIG. 7. The image information 711 is scalar-quantized and four scalar-quantized pixels are packed into one block 712 with the size of 2 pixels×2 pixels so that the packed block 712 includes the quantization coefficients of the four pixels corresponding to the four pixels of the image information 711. If the evaluation unit 104 determines that the block information represents an edge portion of the image, then the vector coding unit 107 is selected and the block information 712 is subjected to vector coding in the vector coding unit 107. If 1 byte of data is used to represent each set of four pixels as shown in FIG. 11, and if all 65 gray levels of the addition-converted data are assigned different code values without degeneration, the remaining 191 values can be assigned to the vector code values. Thus, a table is prepared in the vector coding unit 107 and 191 representative values are stored in that table. When block information is input, the table is retrieved and a value closest to the input block information is output.

For example, the block information 712 is converted by the vector coding unit 107 to an approximated vector 713. Then the code representing the vector 713 is transmitted from the printer driver to the printer. In the printer, the density pattern conversion unit 112 produces two-level data on the basis of the received vector data. As described above, in the case where the data in the form of a vector code is given to the printer, two-level conversion is performed pixel by pixel according to the density pattern generation method. In the specific example in which the expansion ratios are A=B=4, a dot arranging matrix with a size of 4×4 pixels such as a matrix 714 in FIG. 7 is employed in the two-level conversion process. Each of the element values "14", "14", "14", and "2" of the vector code 713 is compared with each pixel values of the dot arranging matrix 714. As a result of the comparison, two-level data 715 is obtained as shown in FIG. 7. Alternatively, a look-up table containing dot patterns corresponding to vector data may be prepared and gray scale pattern conversion may be performed by retrieving the look-up table.

The coding and two-level conversion processes have been described above for both addition-converted code and vector code. The coding scheme is detected from the packing information containing a plurality of pixels, and the two-level conversion is performed according to the detected scheme. This ensures that good gradation characteristics are preserved in plain image areas of an image while high resolution is preserved in edge portions of the image. Furthermore, if the dot arranging matrix used to determine a dot pattern corresponding to a given addition-converted code is optimized for the scalar quantization in the coding process, then it is possible to realize data compression so that the distortion which occurs in the process of producing a gray scale pattern becomes equal to the distortion due to the scalar quantization without having no distortion due to the addition coding.

Figure 8:
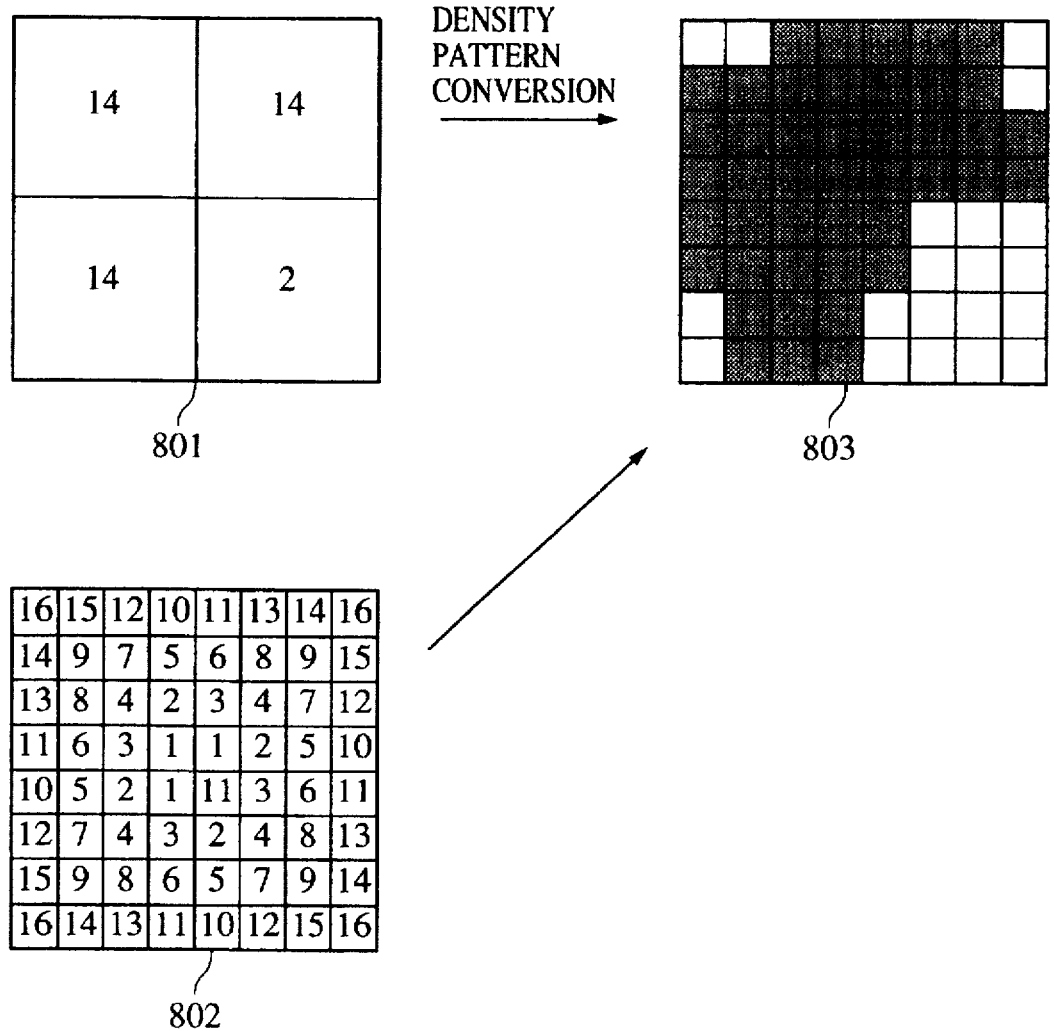
FIG. 8 is a schematic illustration of an example of a two-level conversion process according to a variation of the first embodiment.

FIG. 8 illustrates a method alternative to that shown in FIG. 7 for providing density pattern generation for a vector code. In the technique of FIG. 7 for producing a dot pattern representing gradation, if there is a difference between a dot pattern for an addition code and a dot pattern for a vector code, then there will be a difference in dot gain due to overlapping of adjacent dots formed by the printer. This produces a change in gray level in the image formed on paper even when the original image signal has no corresponding change. In other words, a gap or blank may appear in an image formed on paper, at a location corresponding to a transition between one coding method to the other coding method. Furthermore, if there is a difference between the size of the dot arranging matrix for addition codes and that for vector codes, the size difference may cause another problem.

In the present embodiment, as will be described in grater detail below, it is possible to perform dot arrangement in the same manner with the same size of dot arranging matrix for both addition codes and vector codes.

In FIG. 8, reference numeral 801 denotes an example of a packed vector code which is the same as the vector 713 shown in FIG. 7. The density pattern generation for an addition-conversion code is performed in the same manner as in FIG. 7.

Reference numeral 802 denotes a dot arranging matrix representing density patterns for vector codes. Unlike an addition-converted code, which includes only one value equal to the sum of quantization coefficients of four pixel values, a vector code includes four values to be compared with threshold values in the dot arranging matrix. Therefore, the dot arranging matrix 802 shown in FIG. 8 includes four equal threshold values for each level so that four values in the vector code may be compared with these threshold values. Reference numeral 803 denotes two-level data produced according to the above density pattern generation technique. As described above, the essential feature in this embodiment is in that the dot arranging matrix for determining a dot pattern representing halftone includes one set of threshold values for addition codes while the dot arranging matrix includes C sets of threshold values for vector codes. Thus, in this embodiment, there is no limitation regarding the size of the dot arranging matrix and the procedure of arranging dots.

Second Embodiment

Figure 9:
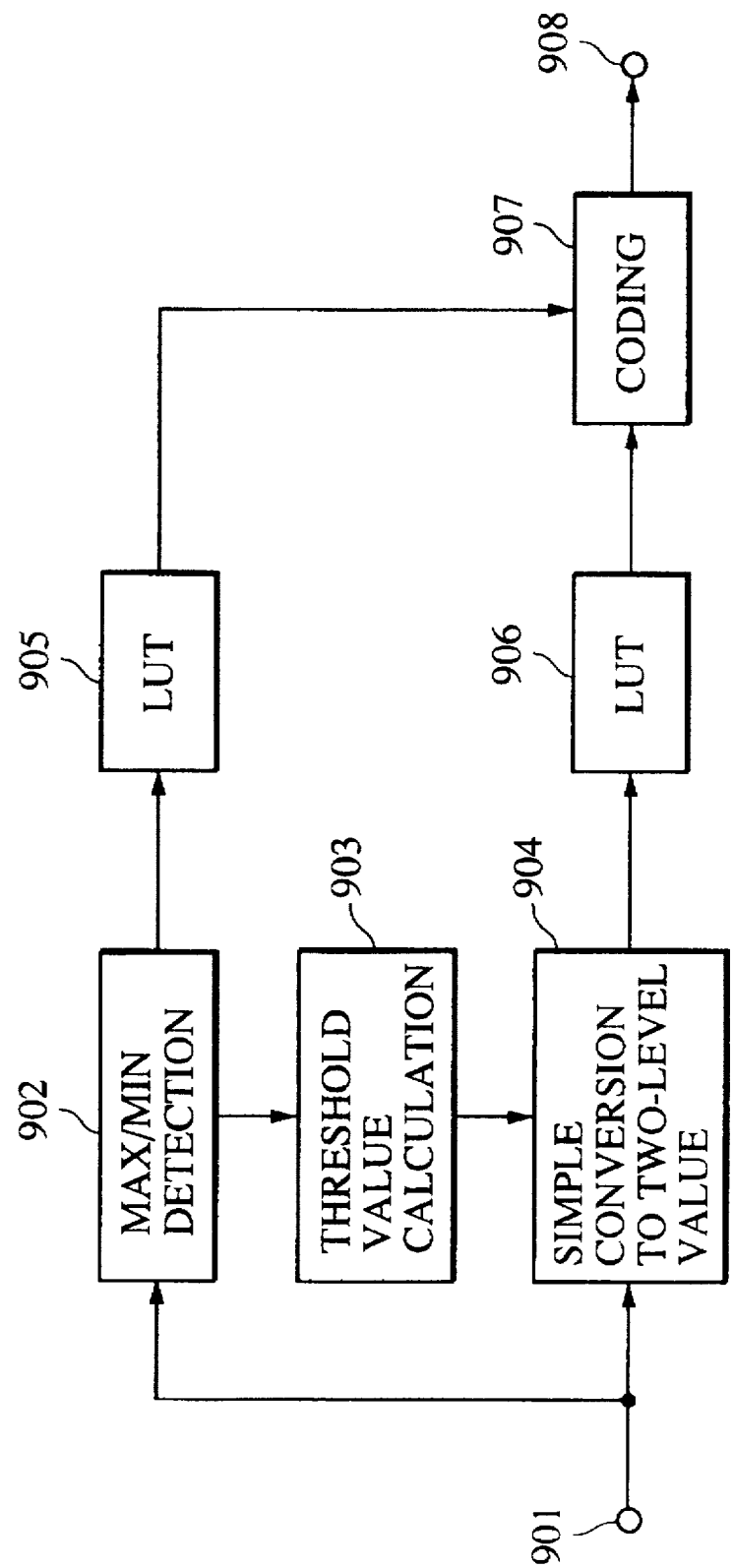
FIG. 9 is a block diagram illustrating the main parts of a second embodiment of the invention.

FIG. 9 is a block diagram illustrating the construction of the vector coding unit of FIG. 1, according to a second embodiment of the invention. If the number C of pixels packed into one block and/or the number p of gray levels are great, it is difficult to determine a vector code value according to a look-up table since the number of possible states becomes as great as p to the power of C (for example in the case where p=17, it may be possible to reduce the value of p from 17 to 16 so as to deal with the data with 4 bits although one gray level is lost).

To avoid the above problem, the present embodiment provides a simple method of assigning a code using a look-up table having a reduced size.

In FIG. 9, quantization coefficients of C pixels packed into a block are supplied to the vector coding unit via an input terminal 901. Reference numeral 902 denotes a max/min detection unit for detecting the maximum and minimum values of C pixels. This max/min detection unit 902 may be the same as the detection mechanism of the evaluation unit 104 shown in FIG. 1. However, in this embodiment, instead of calculating the difference between the maximum and minimum values, the threshold value used to create two-level data corresponding to the C pixels in the packed block is calculated by a threshold value calculation unit 903 on the basis of the maximum and minimum values. In this specific example, the threshold value is given as threshold value= (maximum value+minimum value)/2. On the basis of the calculated threshold value, a simple two-level conversion unit 904 binarizes the quantization coefficients of C pixels in the packed block to a two-level value. The maximum and minimum values are supplied to a look-up table (LUT) 905, and the two-level data associated with the pixels in the packed block is supplied to a look-up table 906. Although in the construction shown in FIG. 9 the two look-up tables 905 and 906 are separated from each other, both tables may be constructed in the same memory. A coding unit 907 produces a code value on the basis of the values output by the look-up tables 905 and 906, and the resultant code value is output via an output terminal 908.

The process according to the present embodiment is described in further detail below with reference to FIG. 10. Here it is assumed that p=17 and C=8. In this case, if a look-up table is used in a simple fashion, there will an extremely large number of states, and thus it is difficult to assign a code.

Figure 10:
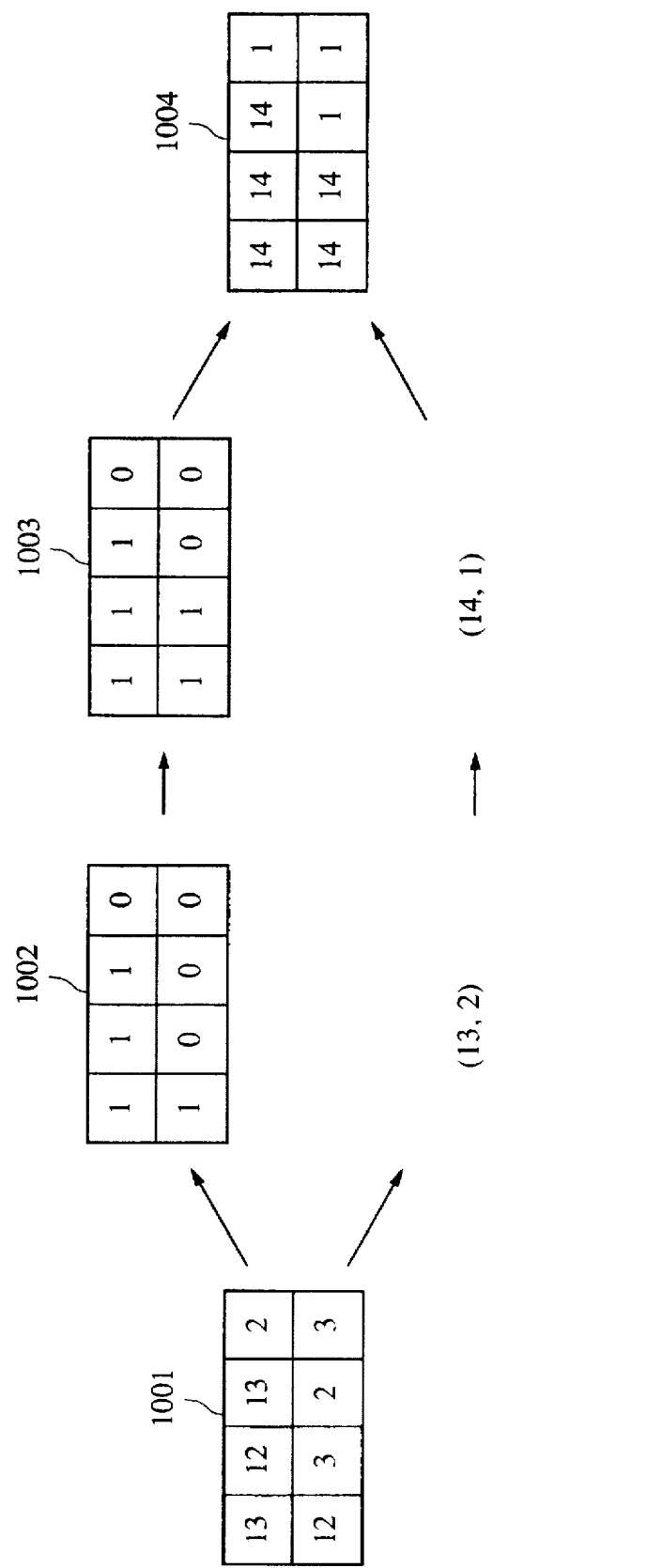
FIG. 10 is a schematic illustration of an example of a process according to the first embodiment.

In FIG. 10, reference numeral 1001 denotes data of a packed block. In the specific example shown in FIG. 10, the max/min detection unit 902 detects a maximum value of 13 and a minimum value of 2, and thus the threshold value calculation unit 903 calculates the threshold value as 7 or 8. The simple two-level conversion unit 904 converts the quantization coefficients into two-level values in a simple fashion on the basis of the threshold value given by the threshold value calculation unit 903. Reference numeral 1002 denotes the result of two-level data obtained in the above-described manner. The above 8-bit two-level data is supplied to the look-up table 906 and is approximated as shown in block 1003 of FIG. 9. On the other hand, the vector data (Max, Min), which is equal to (13, 2) in this specific example, is supplied to the look-up table 905. If it is assumed here that the vector data is approximated as (14, 2), then the final coded data for the packed block is produced from the above approximated data as shown in block 1004 in FIG. 10. In the present embodiment, as described above, the resolution and the gray levels are separately processed. As a result, it is possible to reduce the size of the look-up tables required to calculate the vector code. In the specific example shown in FIG. 10, both resolution and the gray levels are approximated in the compression process. However, if it is allowed to decrease the compression efficiency, then it is more desirable that the resolution be preserved in the processing for the vector codes.

Although the coding process for the quantized data is described above with reference to a specific example, it should be understood that various modifications are possible. For example, the density pattern generation for an addition code may also be performed by comparing addition information of C pixels with threshold values given in a dot arranging matrix, or otherwise after equally distributing addition information among all pixels then comparing the distributed values with threshold values given in a dot arranging matrix. Furthermore, the system construction shown in FIG. 1 may also be modified such that the scalar quantization is performed after the packing of a plurality of pixels into a block.

If the printer has the capability of outputting three or more gray levels, then it is possible to set p such that p=(A×B)×(m −1)+1, where m is the number of gray levels (n>p>m).

Furthermore, in various processes described above, a look-up table may be employed if the process may be implemented using the look-up table.

The technique described above is based on the technique of arranging dots so that gradation is represented by a dot pattern. In this technique, since both the resolution conversion and the two-level conversion are performed at the same time, there is a rather high probability that information contained in original data is lost if the number of gray levels and the expansion ratios are not set properly. For example, when a 256-gray-level signal is given as an input signal, an expansion ratio of 256 (for example 16×16) is required to preserve the amount of information (the total expansion ratio of 256 may be divided into the horizontal and vertical expansion ratios in various ways). If the expansion ratio is less than that, some information is lost.

However, it is possible to minimize the degradation arising during the compression and coding processes by optimizing the scalar quantization process, coding process, and the dot arranging matrix for determining a dot pattern representing gradation.

As described above, in the embodiments described above, image data consisting of a constant length is transmitted to a printer and the printer produces a high-resolution two-level image according to the received data. Furthermore, the system is realized in a simple form which provides a high-speed processing speed, low cost, and a high-quality image without significant degradation due to the compression process. Furthermore, the coding can be performed so that both high resolution and high-quality representation of gray levels are achieved. Still furthermore, the processing can be performed in an adaptive fashion. Thus, the present embodiment provides a high-efficiency and high-quality printer system which requires a small size of look-up table used in coding process.

Third Embodiment

Figure 12:
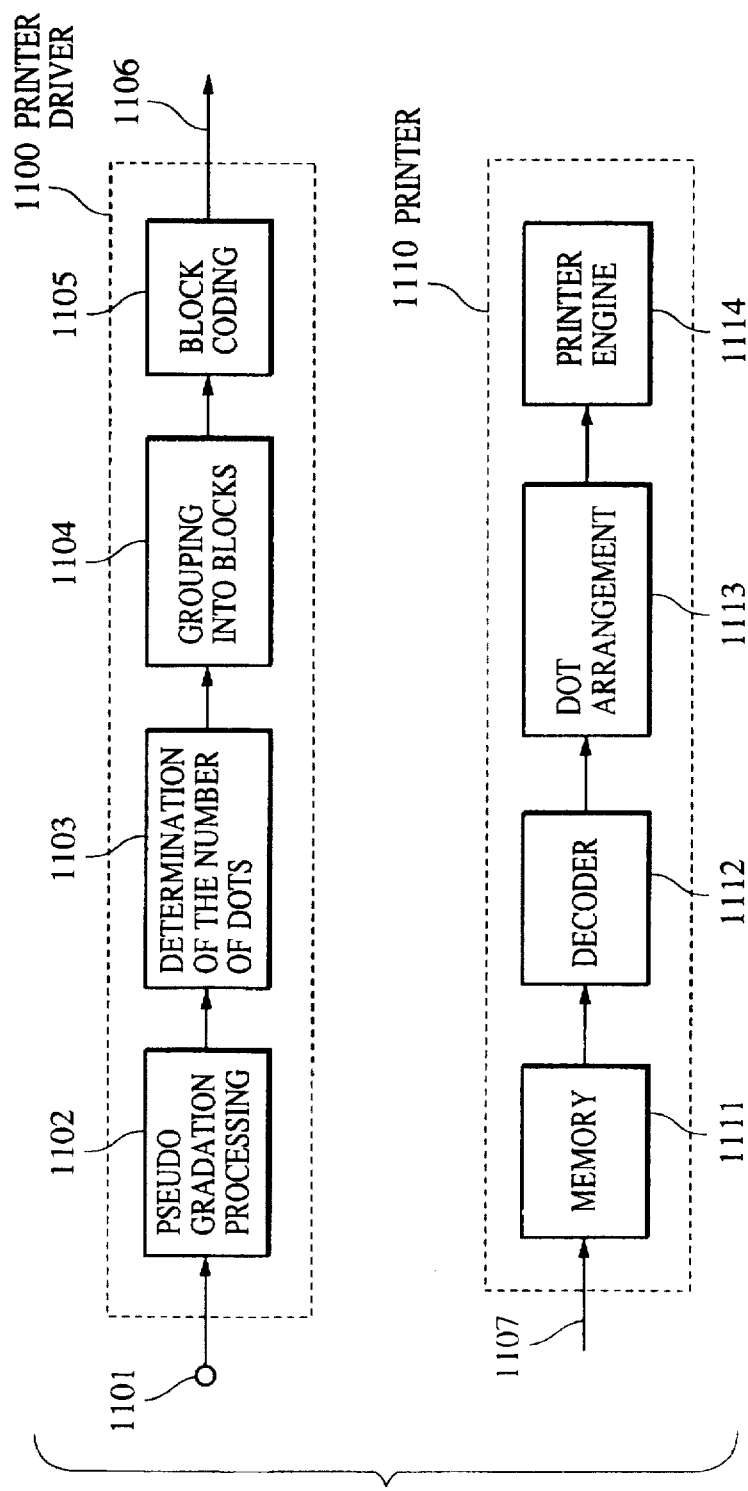
FIG. 12 is a block diagram illustrating the main parts of a third embodiment of the invention.

FIG. 12 is a block diagram illustrating the main parts of a third embodiment of the invention. In FIG. 12, a broken-line box 1100 denotes a printer drive in a host computer, and a broken-line box 1110 denotes a printer. Multi-gray-level image information is created by a host computer with an application software program and supplied to the printer driver via an input terminal 1101. The image information input to the printer driver may be of a natural scene or any other types of images such as characters represented in a page description language (PDL) or image information obtained by rasterizing a line drawing.

Figure 13:
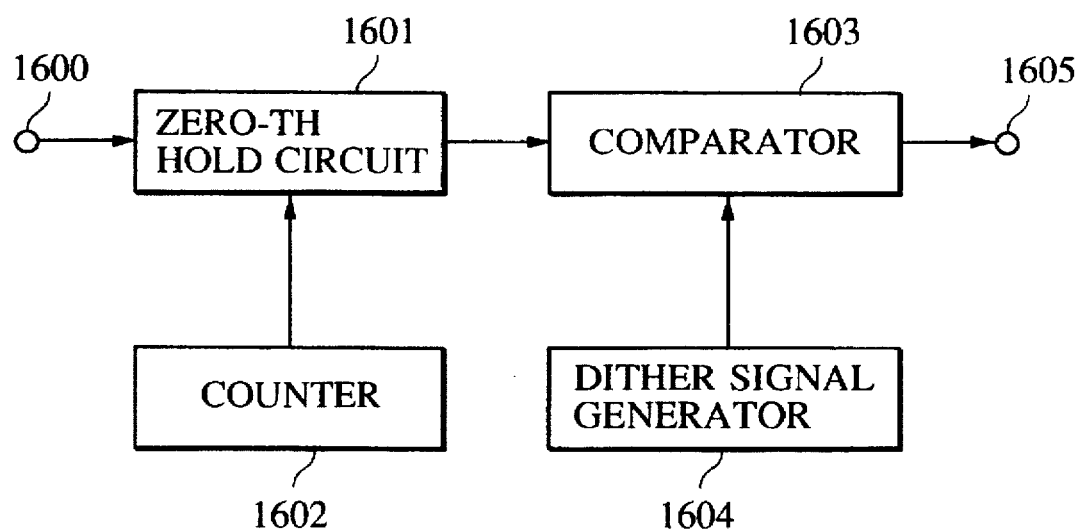
FIG. 13 is a block diagram illustrating a pseudo-gradation processing unit according to the third embodiment.

The multi-gray-level image information is subjected to a pseudo-gradation process in a pseudo-gradation processing unit 1102. An example of the pseudo-gradation processing unit 1102 is described below. FIG. 13 illustrates the construction of the pseudo-gradation processing unit 1102. In FIG. 13, reference numeral 1600 denotes an input terminal via which multi-gray-level image information is input. Reference numeral 1601 denotes a 0th-order holding circuit for outputting the input signal two or more times. Reference numeral 1602 denotes a counter for counting how many times the 0th-order holding circuit outputs the signal. A similar 0th-order holding means is also employed in the sub-scanning direction.

Reference numeral 1603 denotes a comparator for comparing the input multi-gray-level information with a dither signal generated by a dither signal generator 1604. If the comparison result indicates that the input multi-gray-level information is grater than the dither signal, then the comparator outputs a "1" (ON) via an output terminal 1605, while a "0" (OFF) is output in the opposite case. As can be seen from the above description, the specific example of the pseudo-gradation processing unit 1102 shown in FIG. 13 is constructed such that when one input signal is given, a plurality of pixels, for example A×B pixels (A and B are an integer greater than 1), are created thereby achieving pseudo-gradation. In other words, the input signal is first subjected to the 0th-order interpolation to produce data having an expanded size of A×B, and then dithered to obtain two-level data. The size of the dither matrix may be equal to A×B pixels, or may be greater or smaller than that. The dither signal may be perfectly periodical or may include a certain degree of random components.

The values of A and B are determined by the desired expansion ratios. For example, if the input signal has a resolution of 300 dpi (dots per inch) and the printer outputs an image having a resolution of 1200 dpi, then A=B=4. In this case, the pseudo-gradation processing unit 1102 outputs 16 two-level (1-bit) pixel values each time one multi-gray-level (for example 8-bit) image signal is given.

A number-of-dots determination unit 1103 counts the number of "1"-dots contained in the 16 pixels output by the pseudo-gradation processing unit 1102. Thus, the printer driver produces a code representing the number of dots to be finally printed by the printer. In other words, the printer driver 1100 determines how many dots should be output for a pixel of interest. Alternatively, the number of dots may also be determined by superimposing a dither signal on the input signal and further scalar-quantizing the signal.

Reference numeral 1104 denotes a grouping unit for grouping the count values given by the number-of-dots determination unit 1103 into blocks such that the number of pixels contained in each block corresponds to the resolution of data input to a printer. The construction shown in FIG. 12 may be modified such that the grouping unit 1104 is disposed in front of the number-of-dots determination unit 1103 or the pseudo-gradation processing unit 1102. The number of pixels combined into one block may be determined experimentally so that the number of pixels is optimized for the printer system employed. Here, it is assumed that the number of pixels combined into one block is set to C ($\geq 2$).

Reference numeral 1105 denotes a block coding unit for coding the count values given by the grouping unit 1104 into a fixed-length code block by block. The coding may be performed for example according to a combination of the addition code and the vector code shown in FIG. 1. In this embodiment, since data to be coded is given in the form of the number of dots (count values), the coding can be performed simply by employing the sum of the count values as a coded value, and the coded data can be decoded directly into data representing the number of dots contained in the block. As a matter of course, the coding may be performed in different ways.

The fixed-length code produced by the block coding process described above is transmitted from the host computer to the printer via I/Os 1106 and 1107.

In the printer, the received code is stored in a memory 1111. Then image information is read from the memory 1111 and decoded by a decoder 1102 into data representing the number of dots. In the case where the block coding unit 1105 is adapted to code the data representing the number of dots associated with C pixels in a block into a vector code of order C, the decoding is performed by retrieving a decoding look-up table thereby reproducing the number of "1"-dots associated with C pixels. Although a certain degree of quantization distortion occurs which is essential in the fixed-length coding technique, it is possible experimentally to optimize the vector code so that the visible distortion is reduced to an acceptable low level.

A dot arranging unit 1113 arranges dots in a block of A×B or A×B×C pixels on the basis of the decoded data representing the number of dots. In the case where the numbers of "1" dots associated with the C pixels of the input data are given, "1" dots are arranged in C blocks each having a size of A×B pixels in the output data. On the other hand, when the total number of dots contained in a block (as is the case with the addition coding described earlier) is given, "1" dots are arranged in a block with a size of A×B×C pixels. The dot arranging unit 1113 may be implemented using a look-up table or using a technique based on a combination of 0th-order interpolation and dithering as in the specific example of the determination of the number of dots described above.

Figure 14:
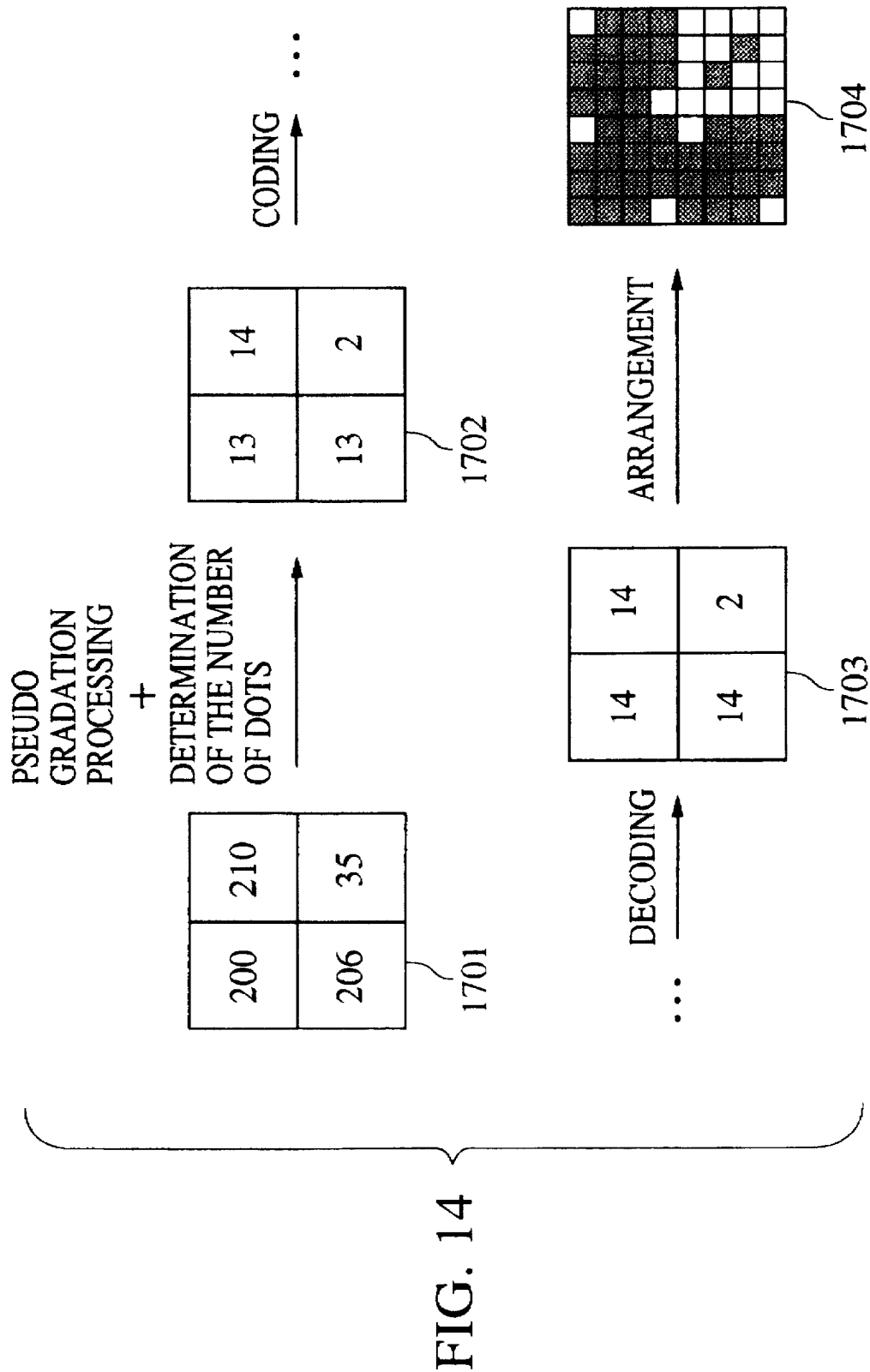
FIG. 14 is a schematic illustration of an example of a process according to the third embodiment.

The operation of the system shown in FIG. 12 is described in further detail below with reference to FIG. 14. In FIG. 14, reference numeral 1701 denotes a part of multi-gray-level image data, or one block of data in which a plurality of pixel values with multi-gray-levels (for example 8 bits/pixel) are combined. As described above, the process of grouping pixels into blocks may be performed either before or after the process of the number-of-dot determination unit 1103. In this specific example, pixels are grouped into blocks with a size of 2×2 pixels. In this case, C=4.

Reference numeral 1702 denotes the data obtained after subjected to the pseudo-gradation process in the pseudo-gradation processing unit 1102 and further subjected to the process of determining the number of dots in the number-of-dot determination unit 1103, and thus the data 1702 represents the number of dots within a block. If the expansion ratios are A=B=4, then the data representing the number of "1" dots of each pixel can have a value in the range from 0 to 16. In the specific example shown in FIG. 14, the pixel values in the block data 701 are converted to the data representing the number of dots such that 200→13, 210→14, 206→13, and 35→2.

The above conversion may be accomplished for example by counting the number of "1" dots obtained after performing the process based on a combination of 0th-order interpolation into expanded data with a size of 4×4 and dithering or error diffusion process, or otherwise may be accomplished by superimposing a dither signal on the pixel values and further scalar-quantizing them.

The data 1702 representing the number of dots is then coded by the block coding unit 1105. In this specific example, the data is subjected to a vector quantization process and is converted to a vector of order 4 (13, 14, 13, 2) in which each element of the vector represents the number of dots, while the coding may also be performed in different ways.

The coded data is then transmitted to the printer. In the printer, the decoder 1112 decodes the received data into a quantized vector 1703 (14, 14, 14, 2). The coding and decoding processes can be easily accomplished using look-up tables.

The process of arranging dots by the dot arranging unit 1113 can also be performed using a look-up table. In this case, dot arrangement patterns corresponding to the number of dots ranging from 0 to 16 are stored in the look-up table. When data is given, a dot arrangement pattern corresponding to the number of dots indicated by the given data is searched for in the look-up table, and the result is output. This technique is known as the density pattern generation method. Two look-up tables for the decoding and the arrangement may be combined into a single look-up table so that a dot pattern corresponding to the received data may be output via the process in conjunction with that table. Reference numeral 1704 denotes a dot pattern output from the dot arranging unit 1113.

In the above-described system having the capability of producing two-level image data representing m gray levels to be output via a high-resolution printer, the number of dots to be finally output is determined by a printer driver, and arrangement of "1" dots in response to the given number of dots is performed in the printer. This allows construction of a high-efficiency printer system. Furthermore, the data representing the number of dots is compressed in units of blocks, and the compressed data having a fixed length is transmitted to a printer. As a result, the amount of information transmitted to the printer can be reduced while maintaining the capability of outputting a high-quality image without significant degradation due to the compression. Thus, an image processing system is realized in a simple form which can provide a high-speed processing speed, low cost, and a high-quality image.

Fourth Embodiment

Figure 15:
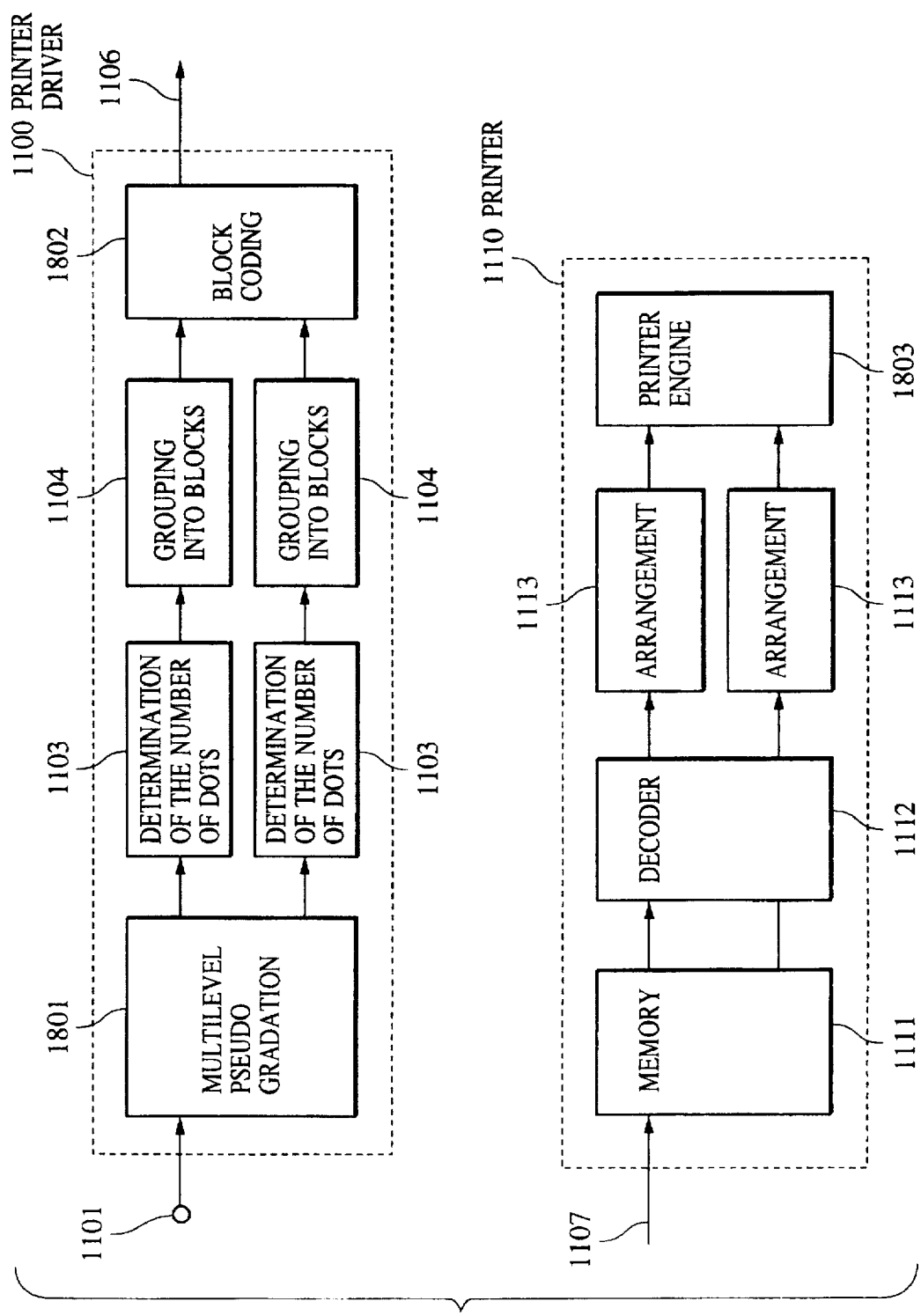
FIG. 15 is a block diagram illustrating the main parts of a fifth embodiment of the invention.

FIG. 15 is a block diagram illustrating the main parts of a fourth embodiment of the invention. This embodiment is a modification of the system shown in FIG. 12, and thus similar elements are denoted by similar reference numerals. The present embodiment is intended to be applied to a printer having the capability of producing an image with multi-intensity-levels for each color. A typical example of such a printer is an ink-jet printer having a plurality of inks having different densities.

In FIG. 15, reference numeral 1801 denotes a multilevel pseudo-gradation processing unit for converting the multi-gray-level (for example 8 bits/pixel) image data given via an input terminal 1101 into data with a lesser number of gray levels. The multilevel pseudo-gradation processing can be accomplished using a known technique. For example, after performing expansion by given expansion ratios by means of interpolation, multilevel dithering may be performed or otherwise multilevel error diffusion may be employed. The multilevel pseudo-gradation process is similar to the pseudo-gradation process employed in the previous embodiments except that the representation of pseudo-gray-levels is accomplished with three or more quantization levels and thus the two-level dithering technique and the error diffusion technique may be employed as in the previous embodiments. That is, the given image data is converted into data with quantization levels which can be represented by the printer engine thereby realizing pseudo-gradation in the output image. For example, if the quantization is performed so that the resulting information has n gray levels, then two-level patterns of (n −1) layers are produced.

Reference numeral 1103 denotes number-of-dot determination units for determining the number of "on" dots for each quantization level. For the purpose of simplicity, it is assumed here that the printer is of the ink-jet type and that it can present three physical gray levels using high- and low-density inks. In the case where the three-gray-level printer is employed, the multilevel pseudo-gradation processing unit 1801 outputs 2-bit data. To deal with the 2-bit data, there are provided two separate number-of-dot determination units, thereby separately determining the number of dots to be printed with the high-density ink and the number of dots to be printed with the low-density ink.

Reference numeral 1104 denotes grouping units for grouping the data representing the number of "ON" dots to be printed with the high- and low-density inks into blocks. As in the previous embodiments, the grouping process may be performed either before or after the process of the number-of-dot determination units 1103.

Reference numeral 1802 denotes block coding units for producing fixed-length data according to the block data of the respective layers produced by the grouping units 1104. In this embodiment, the block data of the respective layers are coded into the form of a vector including both layers rather than into separate data. There is close relationship between these layers, since both layers have the same color whereas the respective layers have different gray levels. Therefore, if both layers are combined into a vector and coding is performed on the vector rather than separately for each layer, then it is possible to achieve high coding efficiency, although the present invention is still useful when the coding is performed separately for each layer.

The coded data produced by the printer driver 1100 is transmitted to the printer 1110 via I/Os 1106 and 1107 and stored in a memory 1111. The data is then read from the memory 1111 and decoded by a decoder 1112 into two separate data representing the number of dots of the respective layers.

Reference numerals 1113 denote dot arranging units for arranging dots in the respective layers according to the number of "on" dots indicated by the decoding unit 1112. Dots can be arranged using a look-up table in the same manner as in the previous embodiments. The resulting pattern information or bit-map information associated with each layer is transmitted to a printer engine 1803 which in turn produces an image in response to the received information.

In the above-described embodiments of the present invention, the method of coding the information representing the number of dots is very important. To achieve a high efficiency in a system in which an image is output with a resolution different from the resolution of the input image information, it is important to perform the coding in the course of the process of converting the image information into a two-level representation (or m-level representation) which can be actually realized in the given printer engine. The two-level conversion is divided into two sub-processes. The first sub-process produces information representing how many dots should be generated, and the second sub-process performs dot arrangement in response to the above information of the number of dots. The first sub-process is performed by the printer driver in the host computer, while the second sub-process is performed by the printer itself.

However, to reduce the size of buffer memory in the printer, it is required to compress the information representing the number of dots. In this case, what is to be coded is the information representing the number of dots, and thus it is required that the data compression should be performed at a stage between the first and second sub-processes of the two-level conversion. The number-of-dot information has less redundancy than the original multi-level information. Therefore, if the number-of-dot information is simply scalar-quantized, the number of gray levels and the number of colors which can be represented are reduced and thus the picture quality is degraded. To avoid the above problems, it is required to group the number-of-dot information into blocks. If the number-of-dot information is coded and vector-quantized in units of blocks, it is possible to minimize the distortion arising during the process of coding the number-of-dot information down to a low level which can be allowed in observation.

In the present invention, as described above, two- or m-level image information used by a high-resolution printer to output an image is generated in such a manner that the number of dots to be output is determined by the printer driver and the arrangement of "on" dots is performed in the printer. This technique makes it possible to construct a high-efficiency printer system. Furthermore, the number-of-dot information is coded into a compressed code in units of blocks, and the resultant information is transmitted in fixed-length form. This allows a reduction in the amount of transmitted information without degrading the image quality as a result of the data compression. Thus, the image processing system is realized in a simple form which can provide a high-speed processing speed, low cost, and a high-quality image.

As described above, there are several preferred methods of operation within the scope of the present invention. As will be apparent to those skilled in the art, each step of those methods can be performed using hardware designed especially for that purpose, or by means of software controlling a computer. In particular, it is possible to implement any of these methods using any desired combination of these two approaches; that is, some of the steps may be performed using software and other using specially-designed circuits. Whatever combination is chosen, the implementation of each step, using either of these approaches, is within the reach of one of ordinary skill.

Although the present invention has been described above with reference to specific embodiments, the description is illustrative of the invention and is not to be construed as limiting the invention. Various modifications and changes may occur to those skilled in the art without departing from the spirit and scope of the invention as defined by the appended claims.

What is claimed is:

1. An image processing apparatus for converting image information each pixel of which has n gray levels into image information with an increased number of pixels each having m gray levels, so that one pixel of the original image information is expanded to A×B pixels in the converted image information (where n and m are integers which satisfy the condition n>m≧2 and where A and B are positive integers at least one of which is greater than 1), said image processing apparatus comprising:

quantization means for scalar-quantizing the image information with n gray levels into image information with p gray levels, wherein said scalar quantizing is performed in units of pixels (where n>p>m);

coding means for coding the image information with p gray levels supplied by said quantization means into a compressed code having a value less than p to the power of C, wherein said coding is performed in units of C pixels (where C≧2);

decoding means for decoding the code supplied by said coding means, wherein said decoding is performed in units of C pixels; and gradation pattern producing means for producing a pixel arrangement pattern representing gradation on the basis of the decoded signal supplied by said decoding means, wherein each pixel of said pixel arrangement pattern has m gray levels.

2. An image processing apparatus according to claim 1, wherein said coding means further comprises:

addition coding means for producing a first code by calculating the sum of quantization coefficients of quantized values of C pixels within a block; and vector coding means for quantizing vector information of quantization coefficients of C pixels within a block and then employing the quantization result as a second code.

3. An image processing apparatus according to claim 2, further comprising:

evaluation means for evaluating the feature value of the image information supplied by said quantization means; and selection means for selecting either said first code or said second code on the basis of the evaluation result given by said evaluation means.

4. An image processing apparatus according to claim 2, wherein said gradation pattern producing means further comprises:

first comparison means for comparing the decoded value of the first code with each of threshold values of a pixel arranging matrix with a size of A×B×C pixels; and second comparison means for comparing each of C pixel values given by the decoded value of the second code with each of threshold values of a pixel arranging matrix with a size of A×B pixels.

5. An image processing apparatus according to claim 3, wherein said evaluation means performs said evaluation on the basis of the difference in image information among plurality of pixels.

6. An image processing apparatus according to claim 1, wherein said quantization means employs different quantization conditions for different pixels.

7. An image processing apparatus according to claim 6, wherein said different quantization conditions are produced by superimposing a dither signal on the quantization threshold values.

8. An image processing apparatus according to claim 1, wherein said number of gray levels p satisfies $$p=(A\times B)\times(m-1)+1.$$

9. An image processing apparatus according to claim 2, wherein said vector coding means performs code assignment using a look-up table.

10. An image processing apparatus according to claim 2, wherein said vector coding means further comprises:

means for selecting two specific pieces of image information from C pixels of image information with p gray levels;

means for converting image information of C pixels each having p gray levels into two-level information;

first vector coding means for coding vector information of the two specific pieces of image information selected; and second vector coding means for performing vector coding on the two-level information of C pixels.

11. An image processing apparatus according to claim 10, wherein said two specific pieces of image information selected are maximum and minimum values of image information of C pixels.

12. An image processing apparatus according to claim 10, wherein said conversion of image information of C pixels into two-level information is performed by employing the mean value of maximum and minimum values as a fixed threshold value.

13. An image processing apparatus according to claim 1, wherein said quantization means, coding means, and transmission means are provided in a printer driver, and said decoding means and gradation pattern producing means are provided in a printer.

14. An image processing apparatus according to claim 13, wherein said printer driver is executed on a host computer.

15. An image processing method for inputting image information each pixel of which has n gray levels and then converting the input image information into image information with an increased number of pixels each having m gray levels so that one pixel of the original image information is expanded to A×B pixels in the converted image information (where n and m are integers which satisfy the condition n>m≥2 and A and B are positive integers at least one of which is greater than 1), said image processing method comprising:

> a quantization step, of scalar-quantizing the image information with n gray levels into image information with p gray levels, wherein the scalar quantizing is performed in units of pixels (where n>p>m);
>
> a coding step, of coding the image information with p gray levels into a compressed code having a value less than p to the power of C, wherein the coding is performed in units of C pixels (where C≥2);
>
> a decoding step, of decoding the coded image information in units of C pixels; and
>
> an outputting step, of outputting a pixel arrangement pattern representing gradation on the basis of the decoded signal, wherein each pixel of the pixel arrangement pattern has m gray levels.

16. An image processing method according to claim 10, wherein said coding step further comprises:

> a first coding step, of producing a first code by calculating the sum of quantization coefficients of quantized values of C pixels within a block; and
>
> a second coding step, of quantizing vector information of quantization coefficients of C pixels within a block and the employing the quantization result as a second code.

17. An image processing method according to claim 15, further comprising:

> an evaluation step, of evaluating the feature value of the image information produced in said quantization step; and
>
> a selection step of selecting either the first code or the second code on the basis of the evaluation result given in said evaluation step.

18. An image processing apparatus for inputting image information each pixel of which has n gray levels and converting the input information into image information with an increased number of pixels each having m gray levels, so that each pixel of the original image information is expanded to A×B pixels in the converted image information, thereby providing pseudo-gradation (wherein n and m are integers which satisfy the condition n>m≥2, and A and B are also integers greater than 1), said image processing apparatus comprising:

> pseudo-gradation processing means for converting a pixel of interest with n gray levels into A×B pixels each having m gray levels so that pseudo-gradation is realized by the resultant A×B pixels;
>
> determining means for determining the number of "on" dots for each gray level of (m −1) layers for each pixel of interest which has been subjected to the pseudo-gradation processing;
>
> grouping means for grouping the determined numbers of dots into blocks such that the number of pixels contained in each block corresponds to the input resolution;
>
> coding means for coding the number-of-dot information associated with each gray level in units of blocks;
>
> decoding means for decoding the code in units of blocks; and
>
> arranging means for arranging "on"-dots within an area of A×B×C pixels for each gray level of (m −1) layers on the basis of the decoded number-of-dot information (where C≥2).

19. An image processing method for inputting image information each pixel of which has n gray levels and converting the input information into image information with an increased number of pixels each having m gray levels, so that each pixel of the original image information is expanded to A×B pixels in the converted image information thereby providing pseudo-gradation (wherein n and m are integers which satisfy the condition n>m≥2, and A and B are also integers greater than 1), said image processing method comprising:

> a pseudo-gradation processing step, of converting a pixel of interest with n gray levels into A×B pixels each having m gray levels so that pseudo-gradation is realized by the resultant A×B pixels;
>
> a determining step, of determining the number of "on" dots for each gray level of (m −1) layers for each pixel of interest which has been subjected to the pseudo-gradation processing;
>
> a grouping step, of grouping the determined numbers of dots into blocks such that the number of pixels contained in each block corresponds to the input resolution;
>
> a coding step, of coding the number-of-dot information associated with each gray level in units of blocks;
>
> a decoding step, of decoding the code in units of blocks; and
>
> an arranging step, of arranging "on"-dots within an area of A×B×C pixels for each gray level of (m −1) layers on the basis of the decoded number-of-dot information (where C≥2).

* * * * *

UNITED STATES PATENT AND TRADEMARK OFFICE
CERTIFICATE OF CORRECTION

PATENT NO. : 5,729,625

DATED : March 17, 1998

INVENTOR(S) : Nobutaka Miyake

It is certified that error appears in the above-identified patent and that said Letters Patent is hereby corrected as shown below:

COLUMN 1

Line 48, "pray" should read --gray--.

COLUMN 2

Line 38, "for example" should read --, for example,--; and

Line 63, "for example" should read --, for example,--.

COLUMN 3

Line 15, "variable length" should read --variable-length--;

Line 40, "m-Gray-Level" should read --m-gray-Level--; and

Line 50, "a number" should read --number--.

COLUMN 12

Line 17, "minimize" should read --to minimize--.

UNITED STATES PATENT AND TRADEMARK OFFICE
CERTIFICATE OF CORRECTION

PATENT NO. : 5,729,625

DATED : March 17, 1998

INVENTOR(S) : Nobutaka Miyake

It is certified that error appears in the above-identified patent and that said Letters Patent is hereby corrected as shown below:

COLUMN 13

Line 5, "example" should read --example,--; and

Line 45, "for example" should read --, for example,--.

COLUMN 14

Line 29, "subjected" should read --being subjected--; and

Line 40, "for example" should read --, for example,--.

COLUMN 16

Line 10, "close" should read --a close--.

UNITED STATES PATENT AND TRADEMARK OFFICE
CERTIFICATE OF CORRECTION

PATENT NO. : 5,729,625
DATED : March 17, 1998
INVENTOR(S) : Nobutaka Miyake

It is certified that error appears in the above-identified patent and that said Letters Patent is hereby corrected as shown below:

COLUMN 19

Line 27, "claim 10," should read --claim 15,--; and

Line 35, "the employing" should read --employing--.

Signed and Sealed this

Eighteenth Day of May, 1999

Attest:

Q. TODD DICKINSON

Attesting Officer

Acting Commissioner of Patents and Trademarks